United States Patent [19]

Blomquist et al.

[11] 3,754,672

[45] Aug. 28, 1973

[54] MOTORCYCLE CARRIER HOIST FOR VEHICLE BUMPER

[76] Inventors: Ruben Blomquist, 104 Ryan Rd.; Herbert Blomquist, 9965 Greenwood Rd., both of Duluth, Minn. 55804

[22] Filed: June 11, 1971

[21] Appl. No.: 152,279

[52] U.S. Cl. .................................. 214/450, 214/331
[51] Int. Cl. .............................................. B60r 9/00
[58] Field of Search ................ 214/75 R, 75 T, 450, 214/331; 187/11

[56] References Cited
UNITED STATES PATENTS

| | | | |
|---|---|---|---|
| 1,603,387 | 10/1926 | Heise | 214/75 T |
| 3,529,737 | 9/1970 | Daugherty | 214/450 |
| 3,347,209 | 10/1967 | Groat | 187/11 |

Primary Examiner—Gerald M. Forlenza
Assistant Examiner—John Mannix
Attorney—Wicks & Nemer

[57] ABSTRACT

A motorcycle carrying attachment for the rear end of a motor vehicle comprising a guide structure having spaced posts supporting a guided structure slidable along the posts and a foldable cradle carried by the guided structure and foldable in a plane parallel to the plane of the posts together with a winch for moving the cradle from a position lying flat on the ground to an elevated position.

7 Claims, 4 Drawing Figures

Patented Aug. 28, 1973
3,754,672
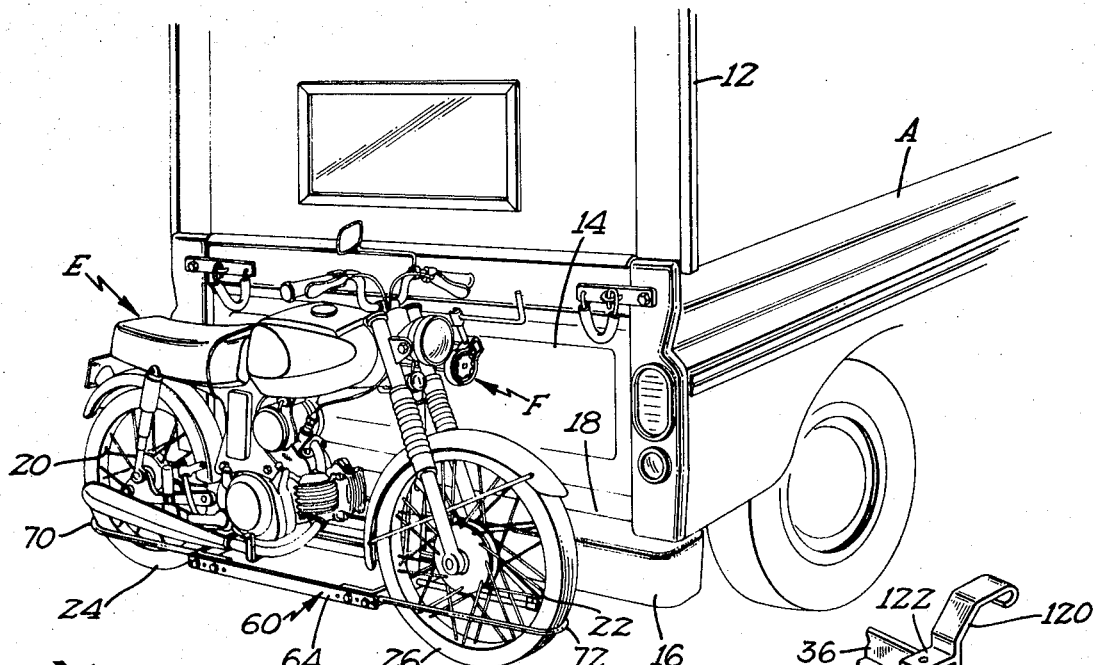
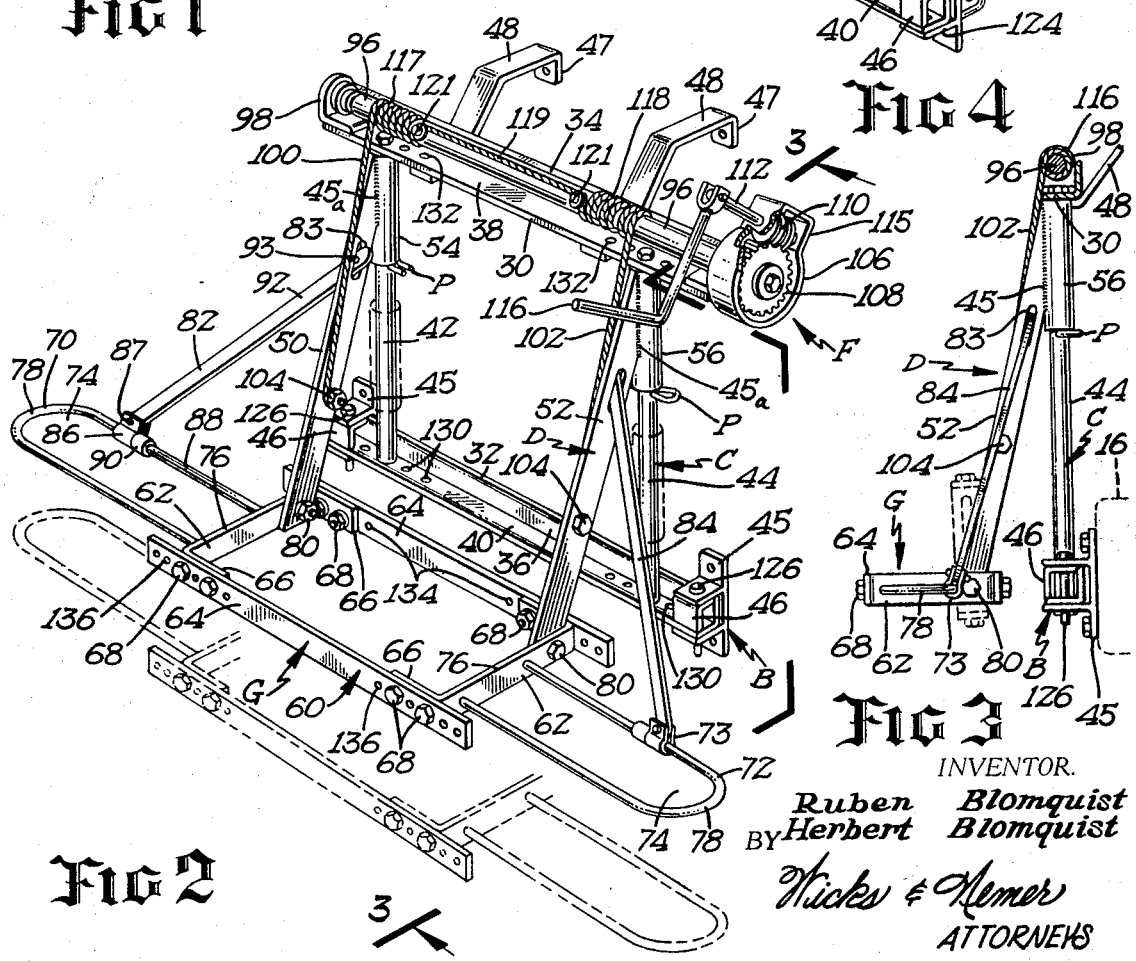
INVENTOR.
Ruben Blomquist
BY Herbert Blomquist
Wicks & Nemer
ATTORNEYS

MOTORCYCLE CARRIER HOIST FOR VEHICLE BUMPER

BACKGROUND OF THE INVENTION

In the prior art the motorcycle has had to be run up an incline making it difficult to mount the motorcycle in the cradle. In addition, a separate jack is used to raise the cradle to horizontal position.

The instant invention utilizes a built-in lifting means permitting raising of the cradle from a position lying flat on the ground to an elevated position clear of the ground and in further providing means for collapsing the attachment to permit it to be permanently mounted on the vehicle.

DRAWINGS

In the drawings illustrating an embodiment of the invention:

FIG. 1 is a perspective view of the rear end of a motor vehicle having a truck body with a carrying attachment illustrating the invention attached thereto and supporting a motorcycle.

FIG. 2 is a perspective view of the attachment removed from the vehicle in raised position with the cradle shown in lowered position on broken lines.

FIG. 3 is an elevational sectional view taken on line 3—3 of FIG. 2.

FIG. 4 is a fragmentary perspective view of an alternate construction for attaching the guide structure to the vehicle.

The disclosure shows a motor vehicle A and on which the motorcycle attachment B is mounted. This attachment comprises a guide structure C attached to the motor vehicle and which supports for up and down movement a guided structure D supporting the motorcycle E. Lifting means F acting between the guide structure C and the guided structure D serve to bring a cradle G for the motorcycle and forming part of the guided structure D from a position lying flat on the ground to an elevated position on the attachment B.

MOTOR VEHICLE

Since motor vehicles are so well-known in the art, only the rear portion of the motor vehicle A has been disclosed and which includes a body 12 having a tailgate 14 and a bumper 16 at the rear of the body 12 and below the same. The rear wall 18 of the bumper 16 projects rearwardly of the tailgate 14.

MOTORCYCLE

The motorcycle B may be of any two-wheel type and the invention contacting only the wheels of the same can be used with any type motorcycle having substantially the same size tires and wheel base. Since only the wheels 20 and 22 are of importance and the tires 24 and 26 thereon, the rest of the motorcycle will not be described in detail.

GUIDE STRUCTURE

The guide structure C includes upper and lower angle frame members 30 and 32 which are arranged with front flanges 34 and 36 extending upwardly from rearwardly extending lower flanges 38 and 40. Attached to the flanges 38 and 40 are spaced posts 42 and 44. The lower frame member 32 has attached to the ends of it flanged members 46 which mount the support members 45 bolted to the bumper 16. The upper frame member 30 has attached to it arms 48, the flanges 47 of which are secured to the tailgate 14.

GUIDED STRUCTURE

The guided structure D consists of two hangers 50 and 52 formed of flat bar stock which are angularly disposed with reference to the posts 42 and 44. These hangers are welded at their upper ends as at 45a to two sleeves 54 and 56 slidable along the posts 42 and 44, respectively.

CRADLE

The guided structure D also includes the cradle G. This cradle comprises a frame 60 which is constructed of bar stock and consists of side frame members 62 formed with angularly disposed ends 66 and to which are bolted by means of bolts 68 parallelly disposed end frame members 64. Attached to the side frame members 62 are two elongated end loops 70 and 72. These loops together with the side members 62 form wells 74 in which the wheels 20 and 22 and the tires 24 and 26 are received, the tires resting on the upper edges 76 of the frame members 62 and upon the ends 78 of the loops 72 when the cradle is raised. The lower ends of the hangers 50 and 52 are hingedly connected to the side frame members 62 of frame 60 by means of bolts 80.

The loops 70 and 72 are braced by means of braces 82 and 84 made of bar stock. The brace 82 has attached to the lower end of it a bearing 86 which receives the front leg 88 of the loop 70 and which leg is rotatable in it. A collar 90 on said leg restrains movement of the brace 82 toward the frame 60. The other end 92 of the brace 82 extends through a slot 83 in the upper end of hanger 50 and has a lug 93 extending through it which engages the inner surface of hanger 50. A similar brace 84 with similar parts extends between hanger 52 and loop 72. The cradle F may swing on the bolts 80 from a horizontal position as shown in FIG. 3 to a position against the hangers 50 and 52. When in its horizontal position the hangers 50 and 52 engage the ends 66 of the frame members 62 and hold the cradle in a horizontal position.

LIFTING MEANS

The lifting means F is in the form of a winch and has an elongated drum 96 journalled in a bearing 98 secured to the flange 38 of angle frame member 30. This drum has two cables 100 and 102 made from a single length of material wound about said drum to form coils 117 and 118, the connecting portion 119 of which extends lengthwise of the drum and passes about pins 121 issuing outwardly from the drum. These cables at their other ends are attached to the hangers 50 and 52 by bolts 104.

A case 106 is mounted on the end of frame member 38, opposite the bearing 98 and provides another bearing, not shown, for the other end of the drum. The drum 96 has mounted on it a worm wheel 108 disposed within the case 106 and which meshes with worm 110 mounted on a shaft 112 which is journalled in bearings 115 formed in case 106. The shaft 113 has attached to it a crank 114 by means of which the shaft 112 may be rotated to raise and lower the cradle F with the motorcycle mounted thereon, the worm 110 and worm wheels 108 holding the cradle in locked adjusted position.

The construction for attaching the attachment to the motor vehicle includes the support members 45 connected to bumper 16 or hook members 120 which engage the edges of a bumper. The hook members each have flanges 122 and 124 for mounting on the angle members 46 upon the frame members 30 and 32 by means of bolts 126.

The distance between the posts 42 and 44 is adjustable to accommodate motorcycles having different wheelbases by use of the holes 130 formed in the flanges 40 and the holes 132 formed in the flange 38 by means of pins formed on the ends of the supports 42 and 44 and nuts threadedly engaging the pins. To accommodate such an adjustment frame members 64 are formed with holes 134 and 136 whereby the distance between the members 62 may be changed.

The method of using the invention is as follows: The attachment is secured to the bumper 16 of the vehicle by bolting the members 45 to the bumper 16. The arms 48 are next bolted to tailgate 14, and the attachement is then in proper position for use. The guided structure D is now lowered by manipulating crank 116 until the cradle G lies flat on the ground in back of the motor vehicle. The motorcycle E is then run over the cradle G with the wheels 20 and 22 of the motorcycle disposed over the wells 74 in the cradle G. The space between the upper edges 76 of the frame members 62 of frame 60 and the ends 78 of the loops 70 and 72 is less than the diameter of the tires and the cradle when raised causes the tires 24 and 26 of the motorcycle to rest on the upper edges 76 of frame members 62 and the ends 78 of loops 70 and 72. Movement of the cradle and motorcycle is accomplished by rotating crank 114 until the wheels 20 and 22 of the motorcycle are the desired distance above the ground. When removal of the motorcycle is desired the procedure is reversed until the cradle F rests on the ground. The motorcycle can then be wheeled off the cradle. The cradle G may be folded to a point against the members 50 and 52 and when so moved the braces 82 and 84 slide partially through the slots 83 in the members 50 and 52. The connection of each of the braces 82 and 84 to the loops 70 and 72 is the bearing 86 and a pivot as at 87. The braces 82 and 84 may be replaced by lengths of cable.

We claim:

1. A motorcycle carrying attachment for motor vehicles comprising:
   a. a guide structure adapted to be attached to the rear of the motor vehicle and including two parallel substantially vertical posts, and
   b. a guided structure including a cradle for supporting a motorcycle and extending rearwardly and outwardly from the guide structure when in use and
   c. sleeves extending about said posts and guiding the cradle for up and down movement along said posts,
   d. transverse substantially horizontal pivot means between the lowermost portion of the guided structure and the forward portion of the cradle which serve to support the cradle for upward and forward movement to a retracted position adjacent the guided structure when the carrying attachment is not in use,
   e. said guided structure including rearwardly inclined hangers attached to the sleeves and pivoted to the cradle by
   f. transverse coaxial pivot members,
   g. said cradle extending rearwardly outwardly from the guide structure when in use, and
   h. a lifting means acting between said guided structure and said guide structure for raising and lowering said cradle,
   i. the guided structure including a rectangular frame pivoted to the lower ends of the inclined hangers and
   j. loops at the ends of said frame for the reception of the tires of the motorcycle.

2. A motorcycle carrying attachment for motor vehicles according to claim 1 in which:
   a. the loops are reinforced by braces
   b. pivoted at their lower ends to the forward legs of said loops near the outer ends of the same,
   c. said braces extending through openings in the upper ends of said hangers and are
   d. formed with lugs at the upper ends thereof engaging said hangers on said facing sides of said hangers.

3. A motorcycle attachment for motor vehicles according to claim 2 in which:
   a. the lifting means is in the form of a winch.

4. A motorcycle attachment for motor vehicles according to claim 3 in which:
   a. the lifting means has an upper frame member attached to the upper ends of the posts,
   b. bearings mounted on said frame member,
   c. a drum journalled in said bearings
   d. a cable attached at one end to said guided structure and attached to and wrapped about said drum at its other end and
   e. crank operated gearing for rotating said drum.

5. A motorcycle attachment for a motor vehicle according to claim 4 in which:
   a. two cables are used and are made from a single piece of material wrapped about the drum to form
   b. separate coils at the ends of the drum with
   c. an integral connecting portion between coils passing about
   d. pins extending outwardly from the drum.

6. The device of claim 1 in which
   a. the loops are reinforced by means connected to said loops and said hangers to hold said loops and said rectangular frame in substantially a horizontal extended position.

7. A motorcycle carrying attachment for motor vehicles comprising:
   a. a guide structure having a pair of posts and adapted to be attached to the rear of the motor vehicle, and
   b. a guided structure movable substantially vertically upon said posts,
   c. said guided structure including a rectangular frame pivoted thereon for supporting a motorcycle,
   d. loops at the ends of said frame,
   e. said loops reinforced by means connecting said loops to said guided structure,
   f. said guided structure including sleeve member slidably mounted on said posts for guiding the guided structure and cradle for upward and downward movement from a substantially horizontal position lying substantially flat on the ground to an elevated substantially horizontal position, and
   g. winch means acting between said guided structure and said guide structure for raising and lowering said cradle.

* * * * *